United States Patent [19]

Oda et al.

[11] Patent Number: 4,798,493

[45] Date of Patent: Jan. 17, 1989

[54] CERAMIC-METAL COMPOSITE BODY

[75] Inventors: Isao Oda; Takao Soma, both of Nagoya, Japan

[73] Assignee: NGK Insulators, Ltd., Nagoya, Japan

[21] Appl. No.: 857,976

[22] Filed: May 1, 1986

[30] Foreign Application Priority Data

Jun. 12, 1985 [JP] Japan ................... 60-126294

[51] Int. Cl.$^4$ .............................................. B25G 3/00
[52] U.S. Cl. .................................. 403/404; 403/273; 403/30; 416/241 B
[58] Field of Search .............. 403/28, 29, 30, 273, 403/179, 404; 416/241 B, 244 A; 29/447

[56] References Cited

U.S. PATENT DOCUMENTS

| | | | |
|---|---|---|---|
| 1,794,782 | 3/1931 | Lord . | |
| 1,940,870 | 12/1933 | Litton . | |
| 2,282,106 | 5/1942 | Underwood | 113/112 |
| 2,297,508 | 9/1942 | Schutte | 253/39 |
| 2,780,561 | 2/1957 | Forge, Jr. | 117/62 |
| 2,891,525 | 6/1959 | Moore | 123/90 |
| 2,948,992 | 8/1960 | Oldfield et al. | 49/92.5 |
| 3,321,565 | 5/1967 | Peterson et al. | 403/30 X |
| 3,340,026 | 9/1967 | Kiwak | 29/195 |
| 3,604,819 | 9/1971 | Krahe . | |
| 3,666,302 | 5/1972 | Kellett | 403/28 |
| 3,801,226 | 4/1974 | Bevan et al. . | |
| 4,014,968 | 3/1977 | Simon | 29/447 |
| 4,055,451 | 10/1977 | Cockbain et al. | 156/89 |
| 4,109,031 | 8/1978 | Marscher | 427/191 |
| 4,123,199 | 10/1978 | Shimizu et al. | 416/244 A |
| 4,176,519 | 12/1979 | Kronogard | 416/241 B |
| 4,214,906 | 7/1980 | Langer et al. | 416/241 B X |
| 4,256,441 | 3/1981 | Arora | 417/407 |
| 4,270,380 | 6/1981 | Gulati et al. | 29/447 X |
| 4,279,576 | 7/1981 | Okano et al. | 403/30 X |
| 4,281,941 | 8/1981 | Rottenkolber | 403/29 |
| 4,325,647 | 4/1982 | Maier et al. | 403/29 |
| 4,341,826 | 7/1982 | Prewo et al. . | |
| 4,371,588 | 2/1983 | Kyle | 428/448 |
| 4,404,935 | 9/1983 | Kraft . | |
| 4,424,003 | 1/1984 | Brobeck | 416/241 B |
| 4,479,293 | 10/1984 | Miller et al. . | |
| 4,479,735 | 10/1984 | Thompson et al. | 403/28 |
| 4,492,737 | 1/1985 | Conolly . | |
| 4,495,684 | 1/1985 | Sander et al. | 29/447 X |
| 4,503,009 | 3/1985 | Asaka . | |
| 4,518,315 | 5/1985 | Kruger | 416/241 B |
| 4,531,269 | 7/1985 | LaBouff | 29/447 X |
| 4,532,179 | 7/1985 | Takami et al. | 428/335 |
| 4,548,786 | 10/1985 | Yohe . | |
| 4,614,453 | 9/1986 | Tsuno et al. | 403/273 X |
| 4,637,960 | 1/1987 | Hatakeyama et al. | 428/469 |

FOREIGN PATENT DOCUMENTS

| | | | |
|---|---|---|---|
| 95540 | 12/1983 | European Pat. Off. | 416/241 B |
| 142334 | 5/1985 | European Pat. Off. . | |
| 139406 | 5/1985 | European Pat. Off. . | |
| 0156484 | 10/1985 | European Pat. Off. . | |
| 0161081 | 11/1985 | European Pat. Off. . | |
| 0184457 | 6/1986 | European Pat. Off. . | |
| 2457231 | of 1976 | Fed. Rep. of Germany . | |
| 2734747 | 2/1979 | Fed. Rep. of Germany | 403/273 |
| 2845716 | of 1980 | Fed. Rep. of Germany . | |
| 54-42520 | of 1979 | Japan . | |
| 58-214018 | of 1983 | Japan . | |
| 60-201902 | 3/1984 | Japan . | |
| 897377 | 11/1953 | Switzerland . | |
| 304836 | 1/1955 | Switzerland . | |
| 502133 | 4/1976 | U.S.S.R. | 403/273 |
| 1394919 | 5/1975 | United Kingdom . | |
| 2104551 | 3/1983 | United Kingdom . | |
| 2169058 | 7/1986 | United Kingdom . | |

OTHER PUBLICATIONS

Japanese Patent Abstract 59-103902; vol. 8, No. 220 (M-330).

American Society for Metals; vol. 3, Ed. 9, U.S., Ohio, 1980, "Properties and Selections: Stainless Steels, Tool Materials and Special Purpose Metals".

687 M.T.Z. Motortechnische Zeitschrift, vol. 44 (1983), Jun., No. 6, Schwabisch Gmund, Deutschland.

*Primary Examiner*—Andrew V. Kundrat
*Attorney, Agent, or Firm*—Parkhurst & Oliff

[57] ABSTRACT

A ceramic-metal composite body comprises a ceramic member with a projection formed thereon and a metallic member with a depression or through hole formed therein. The ceramic member and the metallic member are bonded together by fitting the projection of the ceramic member into the depression or through hole of the metallic member. The difference between the outer diameter of the projection of the ceramic member and the inner diameter of the depression or through hole of the metallic member when the projection of the ceramic member is extracted from the depression or through hole of the metallic member is not less than 0.2% of the outer diameter of the projection of the ceramic member.

11 Claims, 3 Drawing Sheets

FIG_1
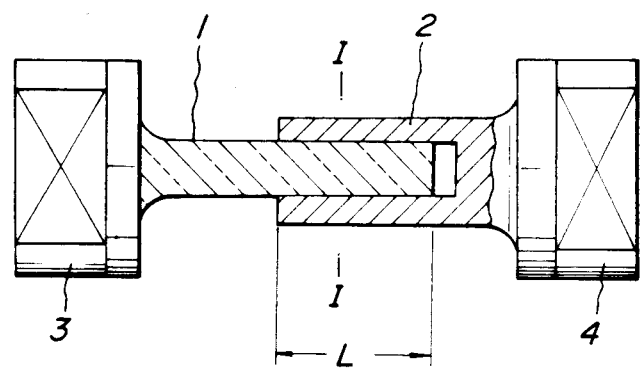
FIG_2
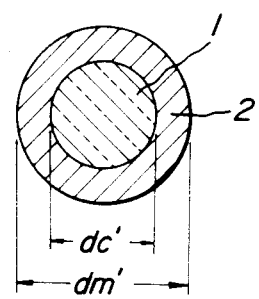

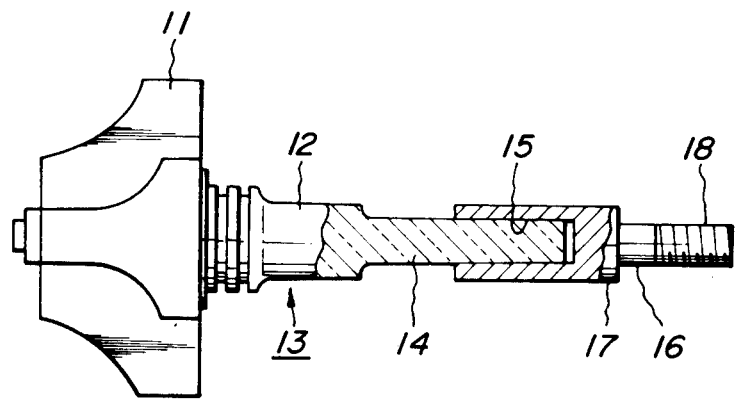
FIG_4
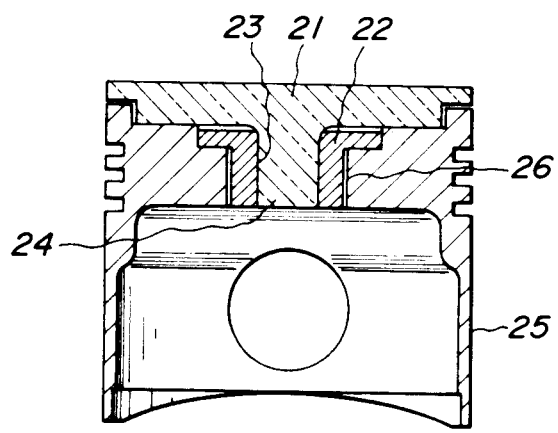
FIG_5

CERAMIC-METAL COMPOSITE BODY

BACKGROUND OF THE INVENTION

1. Field of the Invention

The present invention relates to a ceramic-metal composite body in which a ceramic member is fitted to a metallic member by a mechanical means.

2. Related Art Statement

Since ceramics such as zirconia, silicon nitride, and silicon carbide are excellent in mechanical strength, heat resistance, and wear resistance, they are noted as high temperature structural materials such as gas turbine engine parts, reciprocating engine parts, wear resistant materials, etc. However, ceramics are generally hard and brittle, and therefore, have a poor forming workability as compared with metallic materials. Further, since ceramics are poor in toughness, they have weak impact resistance. For this reason, it is difficult to form machine parts, such as engine parts, from a ceramic material only. Thus, ceramics are ordinarily used in a composite structure in which a metallic member and a ceramic member are fitted together.

As methods of fitting a ceramic member and a metallic member, there are known methods of forming composite bodies by means of fitting a projection of the ceramic member into a depression of the metallic member, that is, by means of a press fitting, expansion fitting, contraction fitting and so on.

There have been various reports on the optimum ranges of temperatures, profiles, etc. at the time of these fittings. For instance, Japanese Patent Application Laid-open No. 60-50,204 describes that a ceramic-metal composite body with excellent properties can be obtained through fitting when the diameter of a projection formed on a ceramic member is made larger by 0.5% to 5% than the inner diameter of a depression formed in a metallic member.

However, these prior art techniques are all directed to limitations on the profile, temperature, etc. prior to the fitting. Therefore, they have shortcomings that a fitting force is unsatisfactory, or a stress is excessive, for instance, depending upon the shape and size of an intended article, use conditions such as temperature, etc., so that ceramic-metal composite bodies with excellent properties can not be obtained. That is, the above-mentioned prior art techniques can not always provide composite bodies with excellent properties for the ceramic-metal composite bodies.

SUMMARY OF THE INVENTION

It is an object of the present invention to overcome the above-mentioned problems, and to provide a ceramic-metal composite body which can always give excellent properties even under any profile and any use conditions.

According to the present invention, there is a provision of a ceramic-metal composite body comprising a ceramic member and a metallic member in which a projection formed on the ceramic member is fitted into a depression or through hole formed in the metallic member, wherein the difference between the outer diameter of the projection of the ceramic member and the inner diameter of the depression of the metallic member when the projection of the ceramic member is extracted from the depression or through hole of the metallic member is not less than 0.2% of the outer diameter of the projection of the ceramic member.

That is, the present invention is based on the discovery that without making restrictions on the profile and the size before the fitting and use conditions such as temperature as in the prior art, the ceramic-metal composite body with excellent properties can be obtained by making restrictions upon the profile after the fitting, that is, the inner diameters of the metallic member before and after the extracting test.

These and other objects, features and advantages of the present invention will be well appreciated upon reading of the following description of the invention when taken in connection with the attached drawings with understanding that some modifications, variations and changes of the same could be easily done by the skilled in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1 and 2 are views showing a profile of a test piece used in a torsional test in connection with the present invention;

FIG. 4 is a partially sectional view showing an embodiment in which the present invention is applied to a turbo charger rotor; and FIG. 5 is a partially sectional view of an embodiment in which the present invention is applied to a piston.

DETAILED DESCRIPTION OF THE INVENTION

Figure 3:
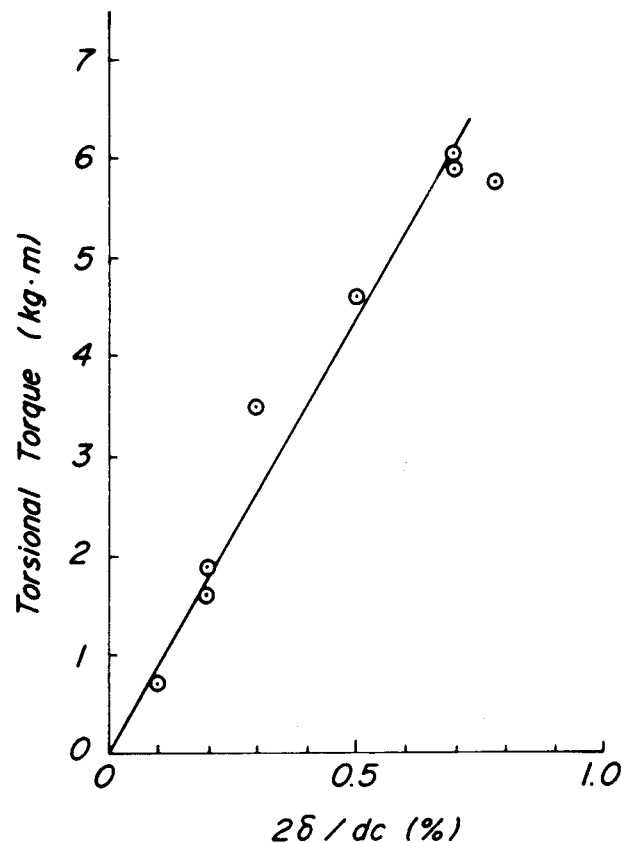
FIG. 3 is a diagram showing the relation between $2\delta/dc$ and a torsional torque.

In actually practicing the present invention, various test pairs of ceramic and metallic members are first prepared while the ratio of the difference between the outer diameter of the projection of the ceramic member and the inner diameter of the depression of the metallic member prior ot the fitting are varied. Through the above experiments, the difference between the outer diameter of the projection of the ceramic member and the inner diameter of the depression of the metallic member after the extraction can be presumed. Consequently, control can be performed in advance to attain the range of the present invention, if profiles, fitting temperature, hardening conditions, etc. are grasped. What is important here is that a composite body made to meet the range according to the present invention under any profile and any use conditions results in a ceramic-metal composite body with excellent properties.

In the present invention, the reason why the difference between the outer diameter of the projection of the ceramic member and the inner diameter of depression of the extracted metallic member when the projection of the ceramic member is extracted from the depression of the metallic member is not less than 0.2% of the outer diameter of the projection of the ceramic member is that as shown in the following examples, if this value is less than 0.2%, a fitting pressure, that is, the tightening force between the ceramic member and the metallic member is insufficient, so that they are loosened during use or, in the worst case, slip out relative to each other.

Further, the reason why the ratio of the outer diameter of the projection of the ceramic member and the outer diameter of the depression portion of the metallic member after the extraction of the projection from the depression or through hole is not more than 90% is that when the value is not less than 90%, even if a sufficient interference is given at the time of the engagement between ceramic member and the metallic member, it may be that the fitting pressure becomes insufficient and actually the metallic member often cracks.

The reason why the fitting is performed while the depression of the metallic member is plastically deformed is that it can absorb working error to reduce variations in strength.

In the following, examples of the present invention will be explained more in detail. However, it should be understood that they are merely illustrative of the invention and should not be construed as limiting the scope of the invention.

First, the interference relation between before and after the extraction test was examined. A ceramic member 1 with a projection of a diameter Dc=10.00 mm before the press-fitting was prepared from a round bar of sintered silicon nitride, while a metallic member 2 with a depression having an inner diameter Di slightly smaller than 10.00 mm and an outer diameter of Dm slightly larger than 12.00 mm before the press fitting was made from an annealed round bar of chrome molybdenum steel (JIS-SCM 435). Both the members are press fitted together at a room temperature such that the fitting distance L may be 12 mm, thereby obtaining a torsional test piece of a profile shown in FIG. 2. Further, after the hardness of the thus obtained torsional test piece was adjusted to HRC 50 through heat treatment, the depression portion was worked to have the outer diameter 12.00 mm. Then, the opposite end portions of the test piece were attached to chuck portions 3 and 4 for the torsional test piece, and subjected to the torsional test to determine a torsional torque. After the torsional test, the projection of the ceramic member is extracted (forceably pulled out) from the depression of the metallic member and the diameter dc of the projection of the ceramic member and the inner and outer diameters of di, dm of the depression of the metallic member were measured at room temperature. Results are shown in Table 1. A change amount $2\delta$ of the inner diameter of the metallic member was determined from the difference between the outer diameter of the projection of the ceramic member and the inner diameter of the depression of the metallic member after the extraction of the projection from the metallic depression, that is, $2\delta = dc - di$.

TABLE 1

| | Prior to press fitting (press fitting conditions) | | | Before extraction | After extraction | | | | |
|---|---|---|---|---|---|---|---|---|---|
| No. | Diameter of projection of ceramic member Dc (mm) | Inner diameter of depression of metallic member Di (mm) | Outer diameter of depression portion of metallic member Dm (mm) | Outer diameter of depression portion of metallic member (mm) | Diameter of projection of ceramic member dc (mm) | Inner diameter of depression of metallic member di (mm) | Outer diameter of depression portion of metallic member dm (mm) | $\frac{2\delta}{dc}$ (%) | Results on torsional test Torsional torque (kg·m) |
| Present invention | | | | | | | | | |
| 1 | 10.00 | 9.85 | 12.00 | 12.00 | 10.00 | 9.92 | 11.95 | 0.8 | 5.8 |
| 2 | 10.00 | 9.88 | 12.00 | 12.00 | 10.00 | 9.93 | 11.96 | 0.7 | 6.0 |
| 3 | 10.00 | 9.90 | 12.00 | 12.00 | 10.00 | 9.93 | 11.96 | 0.7 | 5.9 |
| 4 | 10.00 | 9.94 | 12.00 | 12.00 | 10.00 | 9.95 | 11.98 | 0.5 | 4.6 |
| 5 | 10.00 | 9.96 | 12.00 | 12.00 | 10.00 | 9.97 | 11.99 | 0.3 | 3.5 |
| 6 | 10.00 | 9.98 | 12.00 | 12.00 | 10.00 | 9.98 | 12.00 | 0.2 | 1.9 |
| 7 | 10.00 | 9.98 | 12.00 | 12.00 | 10.00 | 9.98 | 12.00 | 0.2 | 1.6 |
| Comparative Example | | | | | | | | | |
| 8 | 10.00 | 9.99 | 12.00 | 12.00 | 10.00 | 9.99 | 12.00 | 0.1 | 0.7 |

As evident from Table 1, Test pieces Nos. 1–7 according to the present invention with the values of $2\delta/dc$ being not less than 0.2% have torsional torques of not less than 1.6 kg~m and give sufficient tightening forces, while Test piece No. 8 with a value of $2\delta/dc$ being 0.1% according to comparative Example has a torsional torque of 0.7 kg·m and thus a sufficient tightening force could not be obtained. FIG. 3 shows the relation between the above $2\delta/dc$ and the torsional torque.

Next, the radio between the outer diameter of the depression portion of the metallic member and the outer diameter of the projection of the ceramic member was examined. Similarly to the above Examples, a ceramic member 1 having a projection of a diameter Dc=10.00 mm prior to the press fitting was prepared from a round bar of sintered silicon nitride, while a metallic member 2 having a depression with an inner diameter Di of 9.90 mm and an outer diameter slightly larger than 10.50 to 15.00 mm in Table 2 prior to the press fitting was made from an annealed round bar of chrome molybdenum steel (JIS-SCM 435). Both of the members were pressed fitted together. Then, the hardness of the ceramic member was adjusted to HRC 50, and the outer periphery of the depression portion of the metallic member was worked to have Dm shown in Table 2, thereby obtaining a torsional test piece shown in FIGS. 1 and 2. Then, a torsional test was carried out, and results thereof are shown in Table 2. In Table 2, Test piece Nos. 11–13 relate to the present invention and Test piece No. 14 is a Comparative Example shown $2\delta/dc$ of 0.6 to 0.7%.

TABLE 2

| | Prior to press fitting (press fitting conditions) | | | Before extraction | After extraction | | | | Results on torsional test |
|---|---|---|---|---|---|---|---|---|---|
| No. | Diameter of projection of ceramic member Dc (mm) | Inner diameter of depression of metallic member Di (mm) | Outer diameter of depression portion of metallic member Dm (mm) | Outer diameter of depression portion of metallic member (mm) | Diameter of projection of ceramic member dc (mm) | Inner diameter of depression of metallic member di (mm) | Outer diameter of depression portion of metallic member dm (mm) | dc/dm (%) | Torsional torque (kg·m) |
| Present invention | | | | | | | | | |
| 11 | 10.00 | 9.90 | 15.00 | 15.00 | 10.00 | 9.94 | 14.95 | 67 | 6.0 |
| 12 | 10.00 | 9.90 | 12.00 | 12.00 | 10.00 | 9.93 | 11.96 | 84 | 4.9 |
| 13 | 10.00 | 9.90 | 11.50 | 11.50 | 10.00 | 9.93 | 11.48 | 87 | 2.8 |
| Comparative Example | | | | | | | | | |
| 14 | 10.00 | 9.90 | 10.50 | 10.50 | 10.00 | 9.94 | 10.47 | 96 | 0.7 |
| 15 | 10.00 | 9.90 | 10.20 | Metallic member cracked at the time of press fitting. | | | | | |

As evident from Table 2, Test piece Nos. 11 to 13 with a dc/dm of not more than 90% have not less than 3.1 kg·m of the torsional torque, and thus sufficient tightening force can be obtained, while Test piece No. 14 having a dc/dm of more than 90%, as a Comparative Example, produced metal cracks at the time of press fitting, and thus a torsional test piece could not be obtained.

Examples applied to actual articles will be explained below.

EXAMPLE 1

FIG. 4 is a partially sectional view showing an example in which the present invention is embodied in a turbo charger rotor. A ceramic member 13 having a total length of 72 mm and comprising a turbine wheel 11 of a diameter of 61 mm and a turbine shaft 12 of a diameter of 9 mm was integrally made of sintered silicon nitride. A projection 14 of a diameter of 6.0 mm and a length of 17 mm was worked at the tip portion of the turbine shaft of the ceramic member 13. A depression 15 of an inner diameter of 5.8 mm and a depth of 19 mm was formed at one end of a metallic member of aluminum chrome molybdenum steel (JIS-SACM 645) having a total length of 70 mm and a diameter of ]mm. A turbo charger rotor with the turbo wheel and the turbine shaft partially made of silicon nitride was produced by press fitting the projection 14 at the tip end portion of the turbine shaft into the above depression at 350° C. The rotary shaft 16 of the turbo charger rotor on the side of a compressor wheel was worked into a profile of a diameter of 5 mm shown in FIG. 4. A cylinder made of aluminum alloy (JIS-AC4C) with an inner diameter of 5.2 mm, an outer diameter of 30 mm and a length of 25 mm was fitted to the rotary shaft 16 on the side of the compressor wheel and secured by a nut between the flange 17 and a thread formed at one end of the rotary shaft 16 on the side of the compressor wheel at a tightening torque of 15 kg·m. The obtained turbo charger rotor was placed into an electric furnace, and temperature was raised up to 200° C. No abnormality was observed at the press fitting portion between the ceramic member and the metallic member on the turbine shaft, the compressor shaft and the thread portion. This turbo charger rotor was assembled into a high temperature rotary tester, and subjected to a rotary test at 150,000 rpm for 1 hour by using a combustion gas, but no abnormality was observed. The inner diameter of the metallic depression (15) and the outer diameter of the ceramic projection (14) were measured after the extraction of the ceramic projection at room temperature. The 2δ/dc of the turbo charger rotor was found to be 0.45%.

EXAMPLE 2

FIG. 5 is a partially sectional view of an embodiment in which the present invention is embodied in a piston. A disc plate 21 having a diameter of 69 mm and a thickness of 3 mm with a projection having a diameter of 15 mm and a length of 15 mm at the center of a disk plate and was prepared from partially stabilized zirconia ceramics containing 5.2% of $Y_2O_3$. On the other hand, a metallic member 22 of 10 mm in total length with a flange portion of an outer diameter of 35 mm, a barrel portion of an outer diameter of 25 mm, and a depression of an inner diameter of 14.8 mm was formed from nodular graphite cast iron. The projection 24 of the zirconia ceramic member was press fitted into the depression 23 of the metallic member 22 at 500° C., thereby obtaining a metal-ceramic composite body.

Additionally, a hollow portion partially having a through hole into which the metal-ceramic composite body was insertable was formed in a part of a piston crown 26 of a nodular graphite cast iron piston 25 of 70 mm in a diameter. Then, a thread formed in the through hole and the thread formed on the barrel portion of the metallic member of the metal-ceramic composite body were fixed together, thereby preparing a heat insulating engine piston 25 of a profile shown in FIG. 5 in which a part of the piston crown was made of partially stabilized zirconia ceramic and the piston body was made of nodular graphite cast iron. No abnormality was observed in this piston of 70 mm in diameter when it was run in 70 mm diameter diesel engine at a stroke 75 mm, and 2,200 rpm for 1 hour. The inner diameter of the metallic depression (15) and the outer diameter of the ceramic projection (14) were measured after the extraction of the ceramic projection at room temperature.

The present invention should not be limited to the above-mentioned examples only, but numerous modifications and changes are possible. For instance, in the above Examples, silicon nitride and partially stabilized zirconia were used as the ceramic members, but other ceramics such as silicon carbide, sialon, zirconia, mullite, alumina, beryllia, etc. can be used. Further, although chrome molybdenum steel and nodular graphite cast iron are used as the metallic member, other metals, for instance, stainless steel, nickel-chrome-molybdenum, maraging steel, precipitation hardened type alloy may be used. Further, a part or all of the metallic member may be subjected to the precipitation hardening treatment, nitriding treatment and induction hardening, as conventionally known.

As it is evident from the above detailed explanation, according to the ceramic-metal composite body of the present invention, a ceramic-metal composite body which gives sufficient tightening force between the ceramic member and the metallic member can be obtained by restricting the profile after the fitting, that is, the inner diameters of the depression of the metallic member before and after the extraction test, while no limitations being posed upon the profile and size before the fitting and use conditions such as temperature.

Therefore, the present invention is applicable not only to the turbo charger rotor and the gas turbine, but also is applicable to piston, intake and exhaust valves, etc. used in a high temperature use.

What is claimed is:

1. A ceramic-metal composite body comprising a ceramic member having a projection formed thereon and a metallic member having a structural feature selected from the group consisting of a depression and a through hole formed therein, said ceramic member being fitted to said metallic member by fitting the projection of the ceramic member into said structural feature, wherein a difference between an outer diameter of said projection of the ceramic member and an inner diameter of said structural feature after extraction of said projection from said structural feature is not less than 0.2% of the outer diameter of the extracted projection.

2. A ceramic-metal composite body according to claim 1, wherein the ratio of the outer diameter of the projection of the ceramic member to an outer diameter of the structural feature after the extraction of said projection from said structural feature is not more than 90%.

3. A ceramic-metal composite body according to claim 1, wherein the fitting is carried out while said structural feature is plastically deformed.

4. A ceramic-metal composite body according to claim 1, wherein the fitting is done through at least one selected from a group consisting of press fitting, expansion fitting and contraction fitting.

5. A ceramic-metal composite body according to claim 1, wherein the ceramic-metal composite body is a rotary shaft.

6. A ceramic-metal composite body according to claim 1, wherein the ceramic-metal composite body is one selected from a group of a rotary shaft of a turbo charger rotor and a rotary shaft of a gas turbine rotor.

7. A ceramic-metal composite body according to claim 1, wherein the ceramic member comprises at least one material selected from the group consisting of silicon nitride, silicon carbide, sialon, zirconia, mullite, alumina, and beryllia.

8. A ceramic-metal composite body according to claim 1, wherein the metallic member is a least partially hardened through at least one treatment selected from the group consisting of precipitation hardening, nitriding, and high frequency quenching.

9. A ceramic-metal composite body according to claim 1, wherein the metallic member comprises at least one material selected from the group consisting of stainless steel, nodular graphite cast iron, nickel-chrome-molybdenum steel, chrome molybdenum steel, a maraging steel, and precipitation hardened type super alloy.

10. A ceramic-metal composite body according to claim 1, wherein the ceramic-metal composite body is a least a part of a piston, the ceramic member constituting at least a part of a piston head and the metallic member constituting at least a part of a piston body.

11. A ceramic-metal composite body according to claim 1, wherein the ceramic-metal composite body is at least a part of an intake or exhaust valve, the ceramic member constituting at least a part of a valve body of the intake or exhaust valve and the metallic member constituting at least a part of a valve rod of the intake or exhaust valve.

* * * * *